US006947947B2

(12) United States Patent
Block et al.

(10) Patent No.: US 6,947,947 B2
(45) Date of Patent: Sep. 20, 2005

(54) METHOD FOR ADDING METADATA TO DATA

(75) Inventors: Robert S. Block, Marina Del Rey, CA (US); Gary Gannon, Santa Rosa, CA (US); Uday Kothari, Pune (IN); Jonathan Lau, Ma On Shan (HK); Fred Chapus, Irvine, CA (US)

(73) Assignee: Universal Business Matrix LLC, Kirkland, WA (US)

( * ) Notice: Subject to any disclaimer, the term of this patent is extended or adjusted under 35 U.S.C. 154(b) by 264 days.

(21) Appl. No.: 10/086,522

(22) Filed: Mar. 4, 2002

(65) Prior Publication Data

US 2003/0037038 A1 Feb. 20, 2003

Related U.S. Application Data

(60) Provisional application No. 60/312,788, filed on Aug. 17, 2001.

(51) Int. Cl.[7] .............................................. G06F 17/30
(52) U.S. Cl. ................... 707/102; 707/101; 707/103 R; 707/104.1; 709/217
(58) Field of Search .............................. 707/2, 3, 4, 5, 707/101, 102, 103 R, 104.1, 205, 100; 709/217; 715/505, 854, 500; 379/9

(56) References Cited

U.S. PATENT DOCUMENTS

| 4,604,607 | A | * | 8/1986 | Sanderford et al. ...... 340/539.1 |
| 4,939,698 | A | * | 7/1990 | Murphree ..................... 367/88 |
| 5,418,957 | A | * | 5/1995 | Narayan ....................... 717/113 |
| 5,423,034 | A | * | 6/1995 | Cohen-Levy et al. ......... 707/10 |
| 5,491,495 | A | * | 2/1996 | Ward et al. .................. 345/173 |
| 5,553,285 | A | * | 9/1996 | Krakauer et al. ........... 707/202 |
| 5,590,319 | A | * | 12/1996 | Cohen et al. ................... 707/4 |
| 5,630,092 | A | * | 5/1997 | Carreiro et al. ............. 711/111 |
| 5,664,178 | A | * | 9/1997 | Sinofsky ...................... 707/100 |

(Continued)

FOREIGN PATENT DOCUMENTS

| EP | 0702491 A1 | * | 3/1996 | ............. G06F/3/06 |
| EP | 1065584 A1 | * | 1/2001 | ........... G06F/3/033 |
| WO | WO0201397 A1 | * | 1/2002 | ........... G06F/17/00 |

OTHER PUBLICATIONS

XBRL Extensible Business Report Language, "XBRL FAQ", Jul. 17, 2001, pp. 1–4.
"Monarch General FAQ", Nov. 16, 2001, pp. 1–13.
"Extensible Markup Language Frequently Asked Questions or, XML FAQ", Jul. 17, 2001, pp. 1–2.

(Continued)

*Primary Examiner*—Frantz Coby
(74) *Attorney, Agent, or Firm*—Burns, Doane, Swecker & Mathis, LLP

(57) ABSTRACT

A method for adding labels to data, for example XML compliant or XBRL compliant labels, includes a) identifying data in an electronically represented file, b) selecting labels that correspond to text strings in the identified data, based on a list associating labels with text strings, and c) adding the selected labels into the electronically represented file to label the text strings and elements in the identified data associated with the text strings. The labels include information about the data and are defined in one or more taxonomies. When the list does not associate a label with the text string, a user can be prompted to select a label corresponding to a text string in the identified data. The association indicated by the user's selection, can then be added to the list associating labels with text strings.

214 Claims, 7 Drawing Sheets

U.S. PATENT DOCUMENTS

| | | | | |
|---|---|---|---|---|
| 5,717,925 A | * | 2/1998 | Harper et al. | 707/102 |
| 5,721,911 A | * | 2/1998 | Ha et al. | 707/100 |
| 5,758,360 A | * | 5/1998 | Zbikowski et al. | 707/205 |
| 5,857,203 A | * | 1/1999 | Kauffman et al. | 707/200 |
| 5,862,325 A | * | 1/1999 | Reed et al. | 709/201 |
| 5,924,090 A | * | 7/1999 | Krellenstein | 707/5 |
| 6,028,605 A | * | 2/2000 | Conrad et al. | 715/840 |
| 6,035,330 A | * | 3/2000 | Astiz et al. | 709/218 |
| 6,049,819 A | | 4/2000 | Buckle et al. | |
| 6,055,543 A | * | 4/2000 | Christensen et al. | 707/104.1 |
| 6,061,692 A | * | 5/2000 | Thomas et al. | 707/200 |
| 6,122,641 A | * | 9/2000 | Williamson et al. | 707/103 R |
| 6,131,100 A | * | 10/2000 | Zellweger | 707/104.1 |
| 6,151,624 A | | 11/2000 | Teare et al. | |
| 6,163,781 A | * | 12/2000 | Wess, Jr. | 707/103 X |
| 6,199,059 B1 | * | 3/2001 | Dahan et al. | 707/3 |
| 6,212,524 B1 | * | 4/2001 | Weissman et al. | 707/101 |
| 6,240,407 B1 | * | 5/2001 | Chang et al. | 707/2 |
| 6,256,031 B1 | * | 7/2001 | Meijer et al. | 715/854 |
| 6,263,341 B1 | * | 7/2001 | Smiley | 707/103 R |
| 6,269,394 B1 | * | 7/2001 | Kenner et al. | 709/217 |
| 6,282,548 B1 | * | 8/2001 | Burner et al. | 707/104.1 |
| 6,311,194 B1 | * | 10/2001 | Sheth et al. | 715/505 |
| 6,363,377 B1 | * | 3/2002 | Kravets et al. | 707/4 |
| 6,389,426 B1 | * | 5/2002 | Turnbull et al. | 707/102 |
| 6,405,215 B1 | * | 6/2002 | Yaung | 707/104.1 |
| 6,430,575 B1 | * | 8/2002 | Dourish et al. | 707/200 |
| 6,449,341 B1 | * | 9/2002 | Adams et al. | 379/9 |
| 6,535,949 B1 | * | 3/2003 | Parker | 711/103 |
| 6,571,259 B1 | * | 5/2003 | Zheng et al. | 707/205 |
| 6,615,312 B1 | * | 9/2003 | Hamlin et al. | 711/112 |
| 6,760,721 B1 | * | 7/2004 | Chasen et al. | 707/3 |
| 2003/0018661 A1 | * | 1/2003 | Darugar | 707/500 |
| 2003/0126056 A1 | * | 7/2003 | Hausman et al. | 705/36 |

OTHER PUBLICATIONS

XBRL Extensive Business Report Language, "License Agreement and Registration", Aug. 13, 2001, pp. 1–2.
Vortex ML, "Datawatch's new XML Transformation Tool Now Available", Nov. 16, 2001, pp. 1–2.
Monarch V6, "What's New in Monarch Version 6 Professional Edition", Nov. 16, 2001, p. 1.
Monarch, "Hallogram", Nov. 16, 2001, pp. 1–4.
Vortex ML, "Frequently Asked Questions", Nov. 16, 2001, pp. 1–2.
Monarch V6, "Monarch V6 Standard Edition", Nov. 16, 2001, p. 1.
Monarch V6, "Monarch V6 Standard Edition Specs", Nov. 16, 2001, p. 1.
Vortex ML, "Easy Conversion of Text Data into XML1", Nov. 16, 2001, p. 1.
John Connell, Monarch, "TechRepublic Ral World, Real Time, Real IT.", TechRepublic, Inc., 2001, pp. 1–3.
Jeff Jones, "XML 101", Swynk.com, Aug. 13, 2001, pp. 1–8.
Driver's Ed, "Driver Basics", Jan. 3, 2002, p. 1.
"Device Driver", Jan. 3, 2002, p. 1.
"Flat File", Jan. 3, 2002, pp. 1–2.
"CSCI 1100 Introduction to Personal Computing Spring 2001", Jan. 3, 2002, pp. 1–8.
What is a Database?, Jan. 3, 2002, pp. 1–8.
"Taxonomy: Financial Reporting for Commercial and Industrial Companies, US GAAP", Jul. 31, 2000, pp. 1–43.
Datawatch Corporation, "Report Mining, A new way to access corporate information", 1998, pp. 1–8.
John O'Rourke, "Creating Financial Information in XBRL", Strategic Finance, Jun. 2001, pp. 55–73.

* cited by examiner

METHOD FOR ADDING METADATA TO DATA

This application claims priority under 35 U.S.C. §119 to U.S. Provisional Application No. 60/312,788, filed in the U.S. Patent and Trademark Office on 17 Aug. 2001, and which is hereby incorporated by reference.

BACKGROUND OF THE INVENTION

1. Field of the Invention

The invention relates generally to the field of data processing.

2. Background Information

Currently there are thousands upon thousands of software programs installed in millions of computers that cannot transfer meaning from one to the other. For example, large companies with many branches or subsidiaries often find that the accounting or operating software programs used by one division or subsidiary is not compatible with the software used by other divisions or subsidiaries or the central corporate programs. This requires substantial conversions of data and often results in a great deal of data reentry along with the attendant costs and data integrity problems that attend data entry.

Because of the great variety of programs, operating systems and software standards currently used by software developers there is a great deal of incompatibility between suppliers and their customers. This also requires substantial conversions of data and often results in a great deal of data reentry and its implications. The unstructured and undefined nature of the current computer software environment imposes great burdens and expense on regulatory organizations such as the SEC, FDIC, Federal and State tax authorities, banks, etc. and the companies reporting to them.

To overcome this problem many standards organizations have been formed and are being formed to establish defined input/output vocabularies for use with the XML (eXtensible Markup Language) file format. XBRL (extensible Business Reporting Language) is one of the XML language formats being developed. It is expected to become a global standard for financial reporting. Throughout this disclosure we will use XBRL as the example of an XML language. It is not intended to limit the invention to XBRL or XML languages. We find many similarities for the Semantic Web where information Labels are used to facilitate computers talking to computers making decisions and taking action as a result of the communication. Other standards already exist and more will be developed that will benefit by the basic theory of this invention.

Virtually none of the existing software applications can automatically or semi-automatically convert conventional documents or data into outputs tagged with the standardized Information Labels called for by XML or other standards committees. In most cases the standards themselves are still in development. In order for XML and other data dictionaries or business vocabularies to take root, it is required that existing applications and data be associated or tagged with these standard vocabularies. This harsh reality will long delay the widespread use of these standards because it will take years for companies to migrate to new software products that are designed to output the appropriate Information Labels. In some cases that may never happen because it is virtually impossible to replace legacy software systems. For example, retrofitting all the accounting software in current use would be a very complex task that could not be accomplished in any short-term.

The recognized practical approach to standardizing the meaning of data is to attach defined Information Labels to the information being conveyed. In this way the meaning of the data can be determined by reviewing the definition of the label. It also means that computers can recognize the "meaning" of the tagged information and act on it based on that meaning. For example, data with the same "tag" can be added or compared without fear of adding or comparing apples and oranges.

Taxonomies and their extensions are used to define the Information Labels. For example in a financial report, the label <Sales> followed by a numerical value indicates that the numerical value relates to company's Sales. <Cost of Goods Sold> followed by a numerical value indicates that the value represents the company's Cost of Goods Sold. Since Gross Profit is Sales minus Cost of Goods Sold, computers could access 3rd party reports that show these values and easily calculate the Gross Profit with a simple rule that says <Sales><minus><Cost of Goods Sold>= <Gross Profit>.

Because not all companies use the same terminology, the taxonomies used by standards organizations also include synonyms and alternative phrases that have the same meaning. For example synonyms for Sales could include "Revenues" or "Fees". Cost of Goods Sold might be "Cost of Goods" or "Cost of Sales". The Information Labels can also carry information regarding the organizational authority that defined the label. If the taxonomy were authored by the US Securities & Exchange Commission the labels based on that taxonomy might be identified as USSEC, and so on.

Accordingly, there is a need for methods and mechanisms to accurately and efficiently transform data into XML, and in particular XBRL, compliant formats. The transformation would include, for example, adding appropriate labels to the data as defined in relevant XBRL taxonomies. There is also a need for methods and mechanisms to automate entry of XML and XBRL compliant data into non-XML or non-XBRL compliant programs or applications.

*XBRL Essentials*, authored by Charles Hoffman and Carolyn Strand, copyright 2001 by XBRL Solutions, Inc., ISBN 0-87051-353-2, is hereby incorporated by reference.

SUMMARY OF THE INVENTION

In an exemplary embodiment of the invention, a data stream is captured, data in the captured stream are identified, and then the identified data are mapped to a file structure, a schema, or a taxonomy. In exemplary embodiments of the invention, the output data stream is a data stream to a display screen, a memory, a hard drive, a CD ROM drive, a floppy disk drive, or a printer. The output data stream can be conveyed through serial or parallel ports (including Universal Serial Bus or "USB", FireWire™), via wireless interfaces, and so forth. In other exemplary embodiments of the invention, the identified data are mapped to an XBRL (eXtensible Business Reporting Language) taxonomy, a spreadsheet, a database, or a flat file.

In another exemplary embodiment of the present invention, a method for adding labels to data includes a) identifying data in an electronically represented file, b) selecting labels that correspond to text strings in the identified data, based on a list associating labels with text strings, and c) adding the selected labels into the electronically represented file to label the text strings and elements in the identified data associated with the text strings. The labels include information about the data and are defined in one or more taxonomies. In the event the list does not associate a label with the text string, a user can be prompted to select a label corresponding to a text string in the identified data. The association indicated by the user's selection, can then be added to the list associating labels with text strings. Preferably the labels are consistent with XML (eXtensible Markup Language), and also conform to an XBRL (eXtensible Business Reporting Language) specification. This embodiment can be implemented by a transformation program that receives the electronically represented file from a target program. The transformation program a) performs the steps of identifying, selecting and adding, and b) is configured to appear to the target program as a printer driver. The transformation program can be independent and separate from the target program.

In accordance with another embodiment of the invention, a method is provided for importing at least a portion of an XBRL compliant data set into a non XBRL compliant target application. The method includes the steps of exporting data from the target program in an export file, a user associating entries in the export file with labels defined in one or more appropriate XBRL taxonomies, and forming an import file for import into the target program by replacing data in the export file at entries associated with specific labels, with data from the data set having corresponding labels. The associations made by the user are stored for later use, so that an import file can be automatically created by replacing data in a file having the same format as the originally exported file, based on the stored associations.

In accordance with another embodiment of the invention, a method is provided for importing at least a portion of a set of data into a target application, where the data set including labels indicating information about data in the data set, and where the labels are defined in one or more taxonomies. For example, where the data set is XBRL compliant and the labels are defined in one or more XBRL taxonomies. The method includes a data entry program observing a user entering data associated with the labels into the target application, and storing key strokes associated with the entry of data for each different label. Then, when the data entry program receives an XBRL compliant data set for entry into the target application (which can be non XBRL and non XML compliant), the data entry program can enter the data from the data set into the target application, by performing the stored key strokes corresponding to the labels associated with the data in the data set. When the data entry program is automatically entering data into the target application, and encounters a data item having a label for which no keystrokes are stored, the data entry program can prompt the user to enter the data item into the target application, and then observe and store the user's keystrokes for future use.

In accordance with another embodiment of the invention, a method is provided for importing at least a portion of a data set into a target database. The method includes entering test data into the target database, and then searching or scanning the database for patterns corresponding to the test data. A pattern recognition application that is independent from the database can be used for this purpose. A structure of the database is modeled based on the search results. Thereafter, the database can be directly accessed using the modeled structure. In particular, the modeling process includes associating locations within the database structure with labels, where the labels correspond to elements of the test data that were found at the locations during the step of searching. A data element can then be imported directly to a specific location within the database, using for example an independent software application, based on a label associated with both the location and the element.

Exemplary embodiments of the invention include a synonym dictionary that includes synonyms of known labels or terms, or synonymous links between labels and/or terms, to facilitate automatic or user-assisted mapping. The dictionary can include terms that are not part of a taxonomy or schema such as an XML taxonomy, but that are synonymously related to terms in a taxonomy, schema, etc. In an exemplary embodiment of the invention, the synonym dictionary includes foreign languages, so that a label or datum can be mapped from one language into another language. In an exemplary embodiment of the invention, currency values are identified in the data stream, and are converted to corresponding values in different currencies (e.g., from yen to dollars) based on a known or designated exchange rate. In accordance with an embodiment of the invention, the mapping process converts data from one standard to another, for example from U.S. GAAP (Generally Accepted Accounting Principles) to International GAAP. In accordance with an embodiment of the invention, the mapping process includes replacing labels corresponding to identified data, with other labels, for example where minimizing file size is important.

In accordance with an embodiment of the invention, data output from a first computer platform or system can be automatically converted by a software module on the first platform, from a first format into an intermediate format, transferred to a second platform or system, and then converted from the intermediate format into a second format by a second software module on the second platform. For example, the intermediate format can be an XML taxonomy, and the software modules can effectively "translate" so that data can be transparently exchanged between the two platforms regardless of whether the first and second formats are compatible or known to each of the two platforms. The intermediate format can also be encrypted, e.g. for secure transfer.

In accordance with embodiments of the invention, the processing steps and mechanisms described above, are performed in a remote or distributed fashion, in realtime or non-realtime.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

Figure 1A:
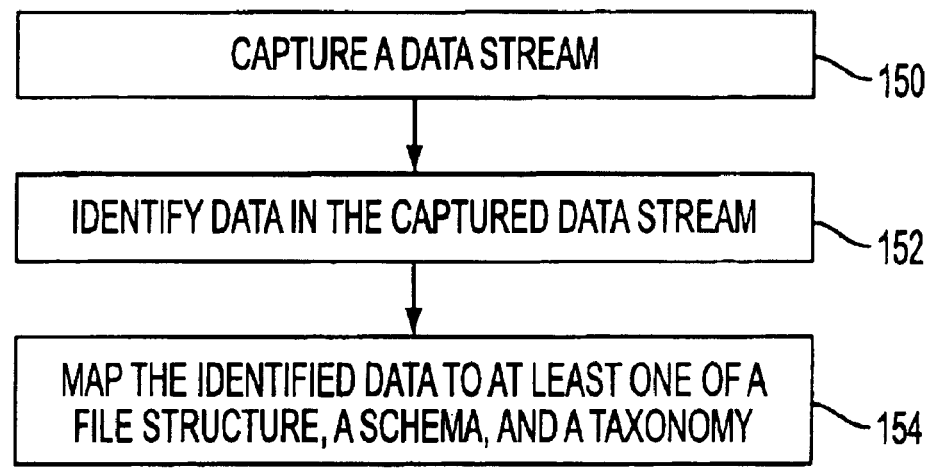
FIG. 1A shows a flowchart in accordance with an exemplary embodiment of the invention.

In accordance with an embodiment of the invention shown in FIG. 1A, a data stream is captured in step 150, data in the captured data stream are identified in step 152, and then in step 154 the identified data are mapped to a file structure, a schema, or a taxonomy. The output data stream is a data stream to a display screen, a memory, a hard drive, a CD ROM drive, a floppy disk drive, or a printer. The output data stream can be conveyed within a computer, through serial or parallel ports (including Universal Serial Bus or "USB", FireWire™, etc.), via wireless interfaces, and so forth, and can be captured via duplication or redirection, at any point along the conveyance, via software and/or hardware mechanisms. The identified data are mapped to an XBRL (eXtensible Business Reporting Language) taxonomy, a spreadsheet, a database, an XML (eXtensible Markup Language) taxonomy, a standard (e.g., U.S. GAAP or International GAAP), or a flat file. When the identified data are mapped to a flat file, a specification or "data definition" file can also be generated to indicate the meaning or character of information at different locations in the flat file (e.g., in different columns, at different locations within a given text string, etc.), and to optionally indicate delimiters (e.g. tabs, commas, spaces, semicolons, etc.) between discrete elements of information or groups of information in the flat file. The flat file and an accompanying data definition can, for example, be generated in accordance with known techniques and formats relating to flat files.

Figure 1B:
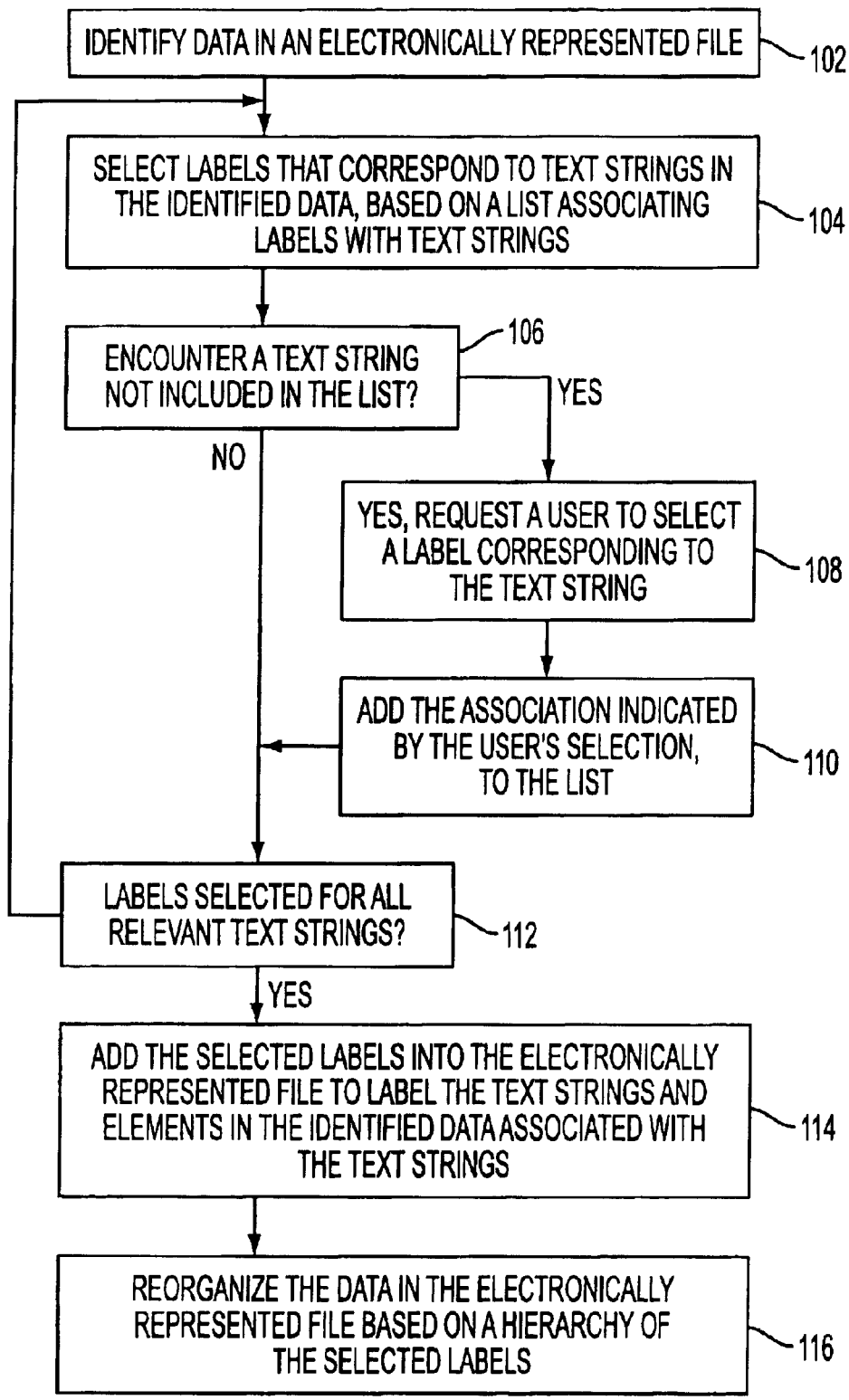
FIG. 1B shows a flowchart in accordance with an exemplary embodiment of the invention.

The embodiment shown in FIG. 1A, can be implemented as shown in FIG. 1B. In accordance with an exemplary embodiment of the invention illustrated in FIG. 1B, a method for adding labels to data includes a) identifying data in an electronically represented file, b) selecting labels that correspond to metadata in the identified data, based on a list associating labels with metadata, and c) adding the selected labels into the electronically represented file to label the metadata and/or elements in the identified data associated with the metadata. The labels include information about the data and are defined in one or more taxonomies. In the context of the present application, "metadata" or "meta information" is data about data, or information that describes other information. In this example the metadata in the identified data identifies or describes other data elements within the identified data, and can include for example text strings, various control characters (e.g., various ASCII control characters), and so forth For example, metadata in the captured data stream or file can be used to identify the data to which the metadata refer, and then additional metadata referring to the identified data can be added to the captured data stream or file. For example, the list can contain labels from multiple taxonomies, standards, and so forth, including words from languages, link synonymous or related labels. When a label from a first taxonomy, etc. is recognized in the captured data stream or file, the data element it labels can also be further labeled with a corresponding label from a second, different taxonomy, standard, etc. Thus a computer program that recognizes the second taxonomy but not the first, will now be able to use or recognize and organize the information in the data stream or file. A new, transformed data stream or file can be formed by adding the new labels for the second taxonomy, and optionally removing the old labels from the first taxonomy (or standard, schema, etc.).

In the event the list does not associate a label with metadata in the identified data, a user can be prompted to select a label corresponding to the metadata. The association indicated by the user's selection, can then be added to the list associating labels with metadata. Preferably the labels are consistent with XML (eXtensible Markup Language), and also conform to an XBRL (eXtensible Business Reporting Language) specification. Of course, the labels can also be consistent with data formats for spreadsheets, relational databases, and other file structures or schemas or standards.

This embodiment can be implemented by a transformation program that receives the electronically represented file from a target program. The transformation program a) performs the steps of identifying, selecting and adding, and b) can be configured to appear to the target program as a type of software known to the target program. For example, the transformation program can appear to the target program as a printer driver.

The transformation program can be independent and separate from the target program. The transformation program can also be entirely resident on the same computer or system as the target program, or can be remotely located on a different system, or distributed among different systems. The transformation module can be a single module, or a plurality of cooperating modules. A list and/or synonym dictionary that the transformation program or module(s) use to identify metadata and add corresponding metadata, can be stored as a data file separately from the program or module(s), and can be stored or accessed remotely, for example via an Internet web server.

For example, the data stream can be captured at an information provider's site, transferred (as a real-time stream of data or as a data file containing contents of the captured data stream) to another location such as an intermediate location or the information receiver's site, and then provided to the information receiver's site. The information provider computer could have, for example, a transformation program emulating a print driver, that is selected when information is to be output for mapping. The output would be provided to the transformation program, and then conveyed to the information receiver machine (by email, modem, file on floppy disk, etc.). A transformation program on the information receiver machine would then open or receive the data, and map it to a batch file format useable by a target import program or to a file format useable by a program written to update a database.

The transformation programs on the provider and receiver machines can be identical and both capable of receiving, transferring and mapping data, or can have different capabilities. For example, the transformation programs can be configured to handle an intermediate format so that the transformation program at the information provider would map the data to an intermediate format, and transfer the data in the intermediate format to the transformation program on the receiver machine. The receiver machine would map the data from the intermediate format to another format useful on the receiver machine (or as desired by a user). The programs could be different versions, so that the transformation program recognizes more formats than the transformation program at the receiver machine and thus can map more formats to or from the intermediate format. In addition or as an alternative, the transformation program on the receiver machine can be configured or featured to only map the data out of the intermediate format to another format, without being able to map data into the intermediate format in much the same way that Adobe Acrobat™ Readers can open and view, but not create, .pdf files. The transformation programs can also be configured to operate automatically without user intervention. For example, the transformation program on the provider machine can automatically transfer data in response to a request from the transformation program on the receiver machine, subject for example to rules or requirements (e.g., a user's prior approval to allow public access to information on the provider machine) in place on the provider machine. The provider and receiver machines can communicate via the Internet. For example, the provider machine can interface the Internet or function as a web server, and the receiver machine can interface the Internet or function as a web browser. Also, the intermediate format can be encrypted, and can be decrypted at the receiver machine in a fashion transparent to a user of the receiver machine. For example, the encryption/decryption mechanism can be a proprietary function of the transformation programs.

The transformation program can alter or transform the file it receives from the target program, for example by adding appropriate XBRL labels to the file. Alternatively, the transformation program can combine data from the file received from the target program, with the selected labels to generate and output a new, transformed file. As a further alternative, the transformation program can replace labels in the file with the newly added labels, for example when converting from one standard or language to another. This is advantageous when it is desirable to minimize the size and complexity of the transformed file or transformed data stream.

As shown in FIG. 1B, in a first step 102, data in an electronically represented file is identified. Next, in step 104, labels are selected that correspond to metadata such as text strings in the identified data, based on a list that associates labels with text strings. Although "text strings" are specifically referred to in FIG. 1B, "metadata" can be substituted for each occurrence of "text string(s)". In other words, the concepts shown in FIG. 1B apply also to all other forms of metadata, not just to text strings. This also holds true for the other embodiments described herein.

From step 104 control proceeds to step 106, where a determination is made whether an unidentified text string, or a text string that does not have an associated label on the list, has been encountered. If yes, then control proceeds to step 108, where the user is prompted to select a label that corresponds to the text string. For example, the user can be provided with one or more taxonomies in a pop-up window or as part of the dialog, so that the correct label can be quickly and easily selected.

From step 108, control proceeds to step 110. In step 110, an association selected by the user in response to the prompt is stored for future use. From step 110, control proceeds to step 112. If in step 106 the determination is negative, then control proceeds from step 106 to step 112.

In step 112, a determination is made whether labels have been selected (using the list, for example) for all relevant text strings in the identified data. The assumption here is that there will be a label in some form associated with each datum, which can be used to map the datum to an appropriate label in, for example, an XBRL taxonomy. The software application performing this function can exercise a degree of intelligence to filter out extraneous or superfluous text, and to properly interpret text and nearby data. For example, in the output from an accounting system, say a Balance Sheet, the output may contain a Report Header and a Report Footer, one or both of which need not be translated depending on the circumstances. Also, it is possible that the text being interpreted and correlated with an XBRL label, may span more than one line but data related to the text will be only on one line. In this situation the software application would appropriately merge multiple lines. In addition, it is possible that a text string may be a label referring or applying to multiple items of data, for example a financial statement with a text label called "cash on hand" and another label for the reporting period of "2000". Placement or location of a datum in the file can also help indicate which XBRL label is appropriate for the datum. Any information relative to the position of the datum in relationship to other data that helps to label it (for example, a placement in a document that would show a data item nested in a specific location within another item, like a hierarchy), can be used help determine an appropriate XBRL label for the datum.

If in step 112 the determination is negative, then control returns to step 104. If in step 112 the determination is positive, then control proceeds from step 112 to step 114. In step 114, the data are re-formatted in accordance with selected labels. In other words, the data are re-formatted based on the determined correspondence between the data and defined labels in one or more XBRL taxonomies. This re-formatting can include adding the corresponding XBRL labels into the data. As indicated in step 116, the reformatting can also include reordering the data in accordance with a hierarchy of the selected/corresponding XBRL labels.

In summary, the transformation program can transform the data in various ways, including inserting and/or interpreting information labels or tags used to describe, characterize, and/or organize the data, to make the data more usable. The transformation program can be made appropriately compatible with various operating systems, including (but not limited to) MS Windows, Unix, Mac OS, Solaris, Linux, and so forth. The transformation program can acquire the data file to be transformed in any of various formats, including as a database file, a flat file, EDI, screen data, or any other collection or stream of data that can be analyzed in a digital format. The transformation program can also output a transformation file including the transformed data, in any appropriate format. For example, the output file can be in any format that is XBRL compliant.

The transformation program can also launch or invoke an application or submodule to validate the output file, and can launch a Compare Program to analyze a received file by comparing text strings in the File with a standardized XBRL taxonomy. Then, the transformation program can compare the text strings in the file with the appropriate XBRL taxonomy (including Synonyms). The comparison may be done either by parsing the data or by using Rev-Gen pattern recognition scanning techniques. Any previous User mapping of XBRL Information Labels to data can also be checked.

The transformation program can also link the appropriate XBRL Information Label to the related information whenever such a link can be clearly established without user intervention. Any text strings that cannot be automatically identified and linked with XBRL taxonomy Information Label will be presented to the User on the first occurrence. Using drag and drop or any other convenient mapping technique, the user will link the information in question with the appropriate XBRL Information Label (tag).

For example, the first time the company publishes financial statements using this technique the name of the company may not be recognized as <Company Name> data. To link the <Company Name> label with the company name data, the user would simply drag the <Company Name> Information Label to the name of the company and the link would be established. This link would then remain in the Transformation Program for subsequent reports so the User would make this connection only once.

The transformation program also can create a new XBRL output file that includes all the appropriate Information Labels, Style information and the proper XML file extension to be XBRL compliant. Once the XBRL Information Labels have been linked to the appropriate data, some of the steps can be bypassed when producing subsequent reports unless a term in the application program has been changed or a new term has been added to the report.

Exemplary embodiments of the invention include a synonym dictionary that includes synonyms of known labels or terms, or synonymous links between labels and/or terms, to facilitate automatic or user-assisted mapping. For example, where a known label in a standard, schema or taxonomy to which captured data stream or file is being mapped is "Sales", the dictionary can include synonyms such as "Fees" and "Revenues" so that when the synonyms are identified in the captured data stream the datum they refer to will be mapped appropriately to (or labeled with) the label "Sales". The synonym dictionary can be incorporated within the list associating data and metadata. The dictionary can include terms that are not part of a taxonomy or schema such as an XML taxonomy, but that are synonymously related to terms in a taxonomy, schema, etc. In an exemplary embodiment of the invention, the synonym dictionary includes foreign languages, so that a label or datum can be mapped from one language into another language.

For example, the transformation program can also be used to translate terms in a document from one language to another. For example, the list associating data and metadata, which the transformation program uses to identify data and select additional or replacement labels, can include languages or portions of languages together links indicating synonyms among the languages. The language portions can be, for example, English language descriptive terms that appear in the U.S. GAAP, and corresponding synonyms in French, German, Spanish, etc., and similar terms that might appear in other standards such as International GAAP. Thus, a user can provide a document containing financial information consistent with U.S. GAAP, to the transformation program, and specify that the transformation program output the document with French words instead of English words. A user can also request the transformation program to convert the U.S. GAAP document into an International GAAP document with German words instead of English words, and so forth. The user can specify the desired output language, and optionally the original language. The transformation program can automatically identify the original language, for example when it finds labels in the captured data, that correspond to labels in its list, that it knows are in a specific language.

In addition, in an exemplary embodiment of the invention, the transformation program can be used to identify currency values identified in the captured data stream or file, and then convert the identified currency values to corresponding values in different currencies (e.g., from yen to dollars) based on a known or designated exchange rate. A default exchange rate can be used, for example the exchange rate that was in effect when a) the original data were created, b) the data stream or file was captured, c) the conversion was performed, or d) a date indicated by a user. The user can also specify the exchange rate.

Figure 2:
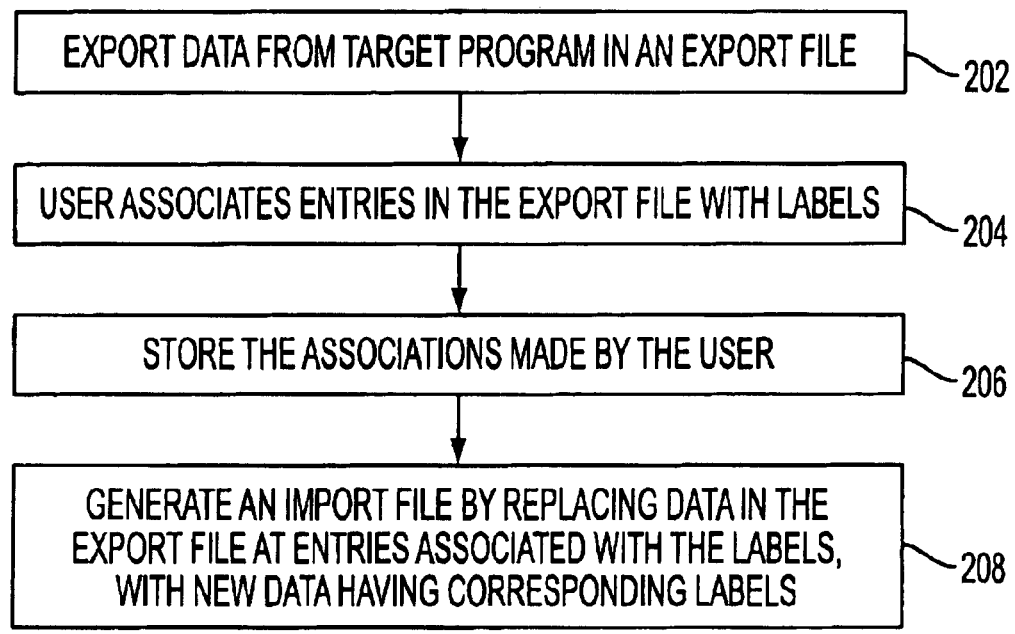
FIG. 2 shows a flowchart in accordance with an exemplary embodiment of the invention.

In accordance with another embodiment of the invention illustrated in FIG. 2, a method is provided for importing at least a portion of an XBRL compliant data set into a non XBRL compliant target application. The method includes the steps of exporting data from the target program in an export file, a user associating entries in the export file with labels defined in one or more appropriate XBRL taxonomies, and forming an import file for import into the target program by replacing data in the export file at entries associated with specific labels, with data from the data set having corresponding labels. The associations made by the user are stored for later use, so that an import file can be automatically created by replacing data in a file having the same format as the originally exported file, based on the stored associations. An import file template can be generated based on the structure of the export file and the associations made by the user, and an import file can then be formed by populating the import file template with data by entering the data based on labels associated with both the data being entered and entries in the import file template. The template can of course be reused to import different sets of data. The user can indicate associations between entries in an export/import file format in any appropriate or suitable way. For example, the user can insert data associated with labels into various entries of the export file, and then software can scan the entries in the export file, discern the associated labels based on the newly entered data, and then store the associations for later use when populating an (empty) import file template with data for import into the target program or target application. A structure of the export file together with the stored associations can represent an import file template. The newly entered data can include the labels themselves. Alternatively, software can, for each entry in the export file, present a list of labels, and a user can select one or more appropriate labels from the list to indicate the association, which is then stored. The template can be populated with data for import, for example, by discerning a label associated with a datum to be imported, locating an entry in the template associated with the same label, entering the datum into the located entry in the template, and repeating these steps for all data in a data set to be imported.

As shown in FIG. 2, in step 202 data is exported from target application or program in an export file. From step 202 control proceeds to step 204, where a user associates entries in the export file, with labels, for example labels defined in an XBRL taxonomy. From step 204 control proceeds to step 206, where the associations made by the user are stored. From step 206 control proceeds to step 208, where an import file is generated by replacing data in the export file at entries or locations associated with the (e.g., XBRL) labels, with new data having corresponding labels.

Figure 3:
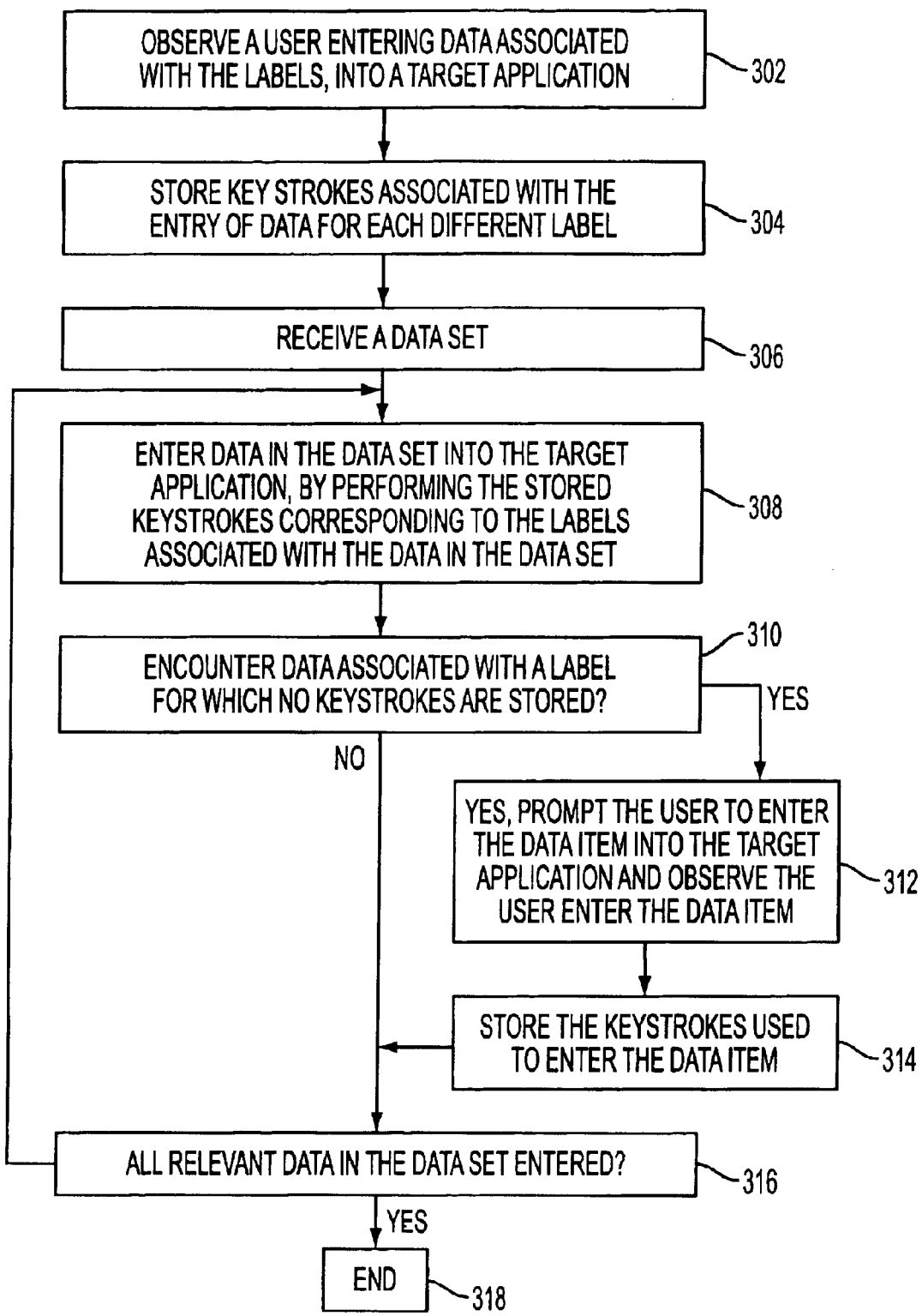
FIG. 3 shows a flowchart in accordance with an exemplary embodiment of the invention.

In another embodiment of the invention illustrated in FIG. 3, a method is provided for importing at least a portion of a set of data into a target application, where the data set including labels indicating information about data in the data set, and where the labels are defined in one or more taxonomies. For example, where the data set is XBRL compliant and the labels are defined in one or more XBRL taxonomies. The method includes a program observing a user entering data associated with the labels into the target application, and storing key strokes associated with the entry of data for each different label. Then, when the data entry program receives an XBRL compliant data set for entry into the target application (which can be non XBRL and non XML compliant), this program or a different program can enter the data from the data set into the target application, by performing the stored key strokes corresponding to the labels associated with the data in the data set. If the program that is automatically entering data into the target application, encounters a data item having a label for which no keystrokes are stored, it can prompt the user to enter the data item into the target application, and then observe and store the user's keystrokes for future use.

As shown in FIG. 3, in a first step 302 a first software application observes a user entering data associated with the labels, into a target application. From step 302 control proceeds to step 304, wherein the first application stores observed keystrokes associated with entry of data for each different label (e.g., XBRL label). From step 304, control proceeds to step 306, where the first application receives a data set for entry into the target application. From step 306, control proceeds to the 308, where the first application enters data from the data set into the target application, by performing the stored keystrokes corresponding to the labels associated with the data in the data set. From step 308, control proceeds to step 310, where a determination is made by the first application, whether it has encountered any data in the data set for which it has no stored keystrokes. In other words, whether there is any data in the data set having a label for which the first application has not stored or observed any keystrokes. If yes, then control proceeds to step 312, where the first application prompts the user to enter the data item into the target application, or otherwise provide an appropriate sequence of keystrokes to enter the data item into the target application. For example, an appropriate sequence could be selected from a menu or group of prerecorded keystroke sequences. From step 312, control proceeds to step 314, where the provided keystroke sequence is stored for future use by the first application. From step 314, control proceeds to step 316.

If in step 310 the determination is negative, then control proceeds to step 316.

In step 316, the first application determines whether all relevant data in the data set has been entered into the target application. If yes, then control proceeds to step 318, where the process ends. If no, then control returns to step 308. "Relevant" data can be determined or handled subject to the considerations discussed above with respect to step 112 of FIG. 1.

Figure 4:
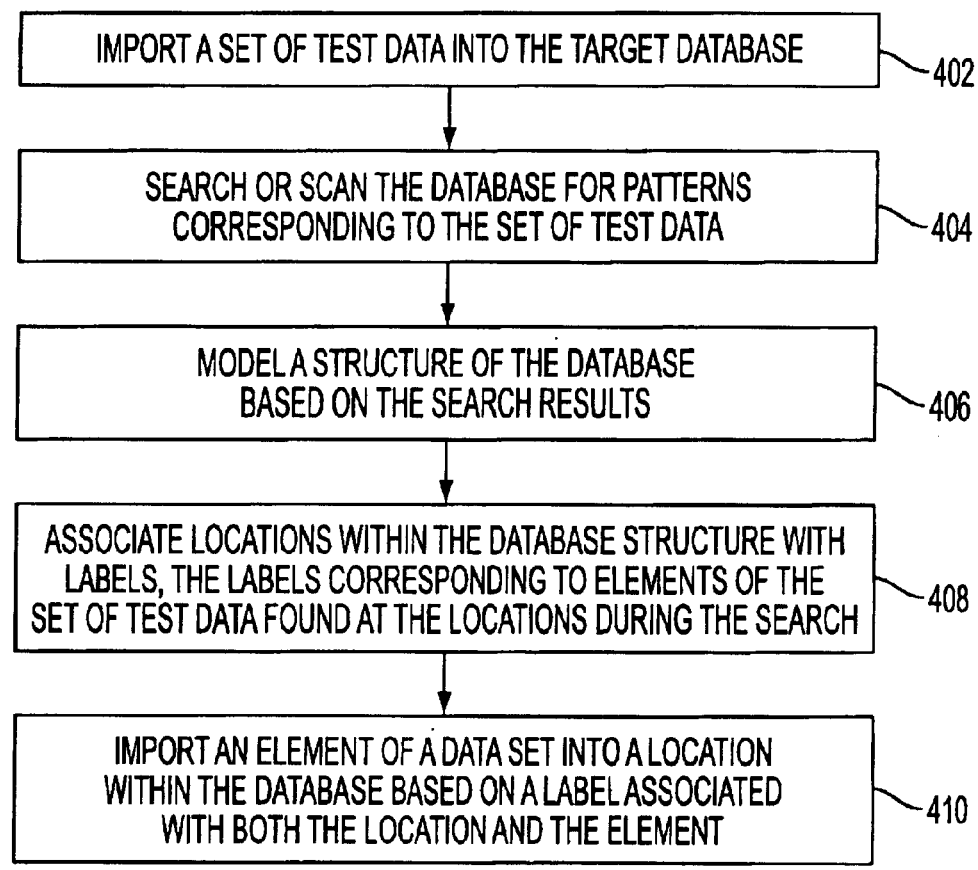
FIG. 4 shows a flowchart in accordance with an exemplary embodiment of the invention.

In accordance with another embodiment of the invention illustrated in FIG. 4, a method is provided for importing or inputting at least a portion of a data set into a target database. The method includes entering test data into the target database, and then searching or scanning the database for patterns corresponding to the test data. A pattern recognition application that is independent from the database can be used for this purpose. A structure of the database is modeled based on the search results. Thereafter, the database can be directly accessed using the modeled structure. In particular, the modeling process includes associating locations within the database structure with labels, where the labels correspond to elements of the test data that were found at the locations during the step of searching. A data element can then be inserted directly to a specific location within the database, using for example an independent software application, based on a label associated with both the location and the element.

As shown in FIG. 4, in a step 402, a set of test data is imported or inputted into a target database. Preferably the set is entered into the database in a conventional fashion, for example by key entry through an interface of an application that manages the database. The database can be separate from the managing application, or can be embedded within the managing application. From step 402, control proceeds to step 404, where the database is scanned by an independent software application, for example a pattern recognition application such as that manufactured by the British company RevGen Plc. and distributed by their U.S. affiliate, Generos corporation. The independent application searches or scans the database for patterns corresponding to the set of test data.

From step 404 control proceeds to step 406, where an independent application (for example, the pattern recognition application or another, separate application) constructs a model of the structure of the database, based on the search/scan results. From step 406 control proceeds to step 408, where locations in the database structure are associated with labels, for example labels defined in one or more XBRL taxonomies. The labels correspond to elements of the test data found at those locations in the database structure during the search/scan. From step 408, control proceeds to step 410, where an element from a data set is imported directed into the database based on a label associated with both the location and the element.

Figure 5:
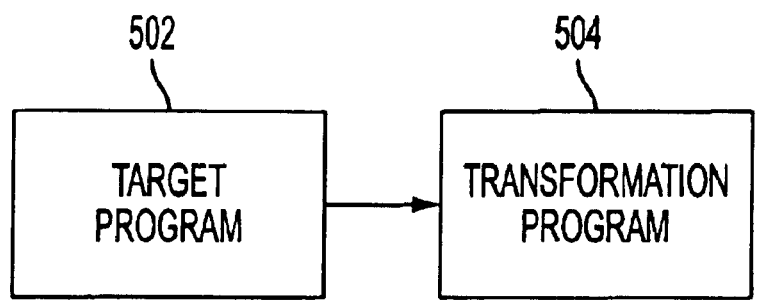
FIG. 5 shows a relationship between a target program and a transformation program in accordance with an embodiment of the invention.

FIG. 5 shows a transformation program consistent with the embodiment described in FIG. 1. As shown in FIG. 5, the transformation program can be independent and separate from the target program. Specifically, a target program 502 provides an output file such as a print file to a transformation program 504. The transformation program 504 is configured so that it appears to the target program as a printer driver. The transformation program 504 does not require or perform any modification or alteration of the target program 502, and can be designed or configured to function compatibly with commercially available target programs such as spreadsheets, accounting programs, word processing programs, and so forth.

Figure 6:
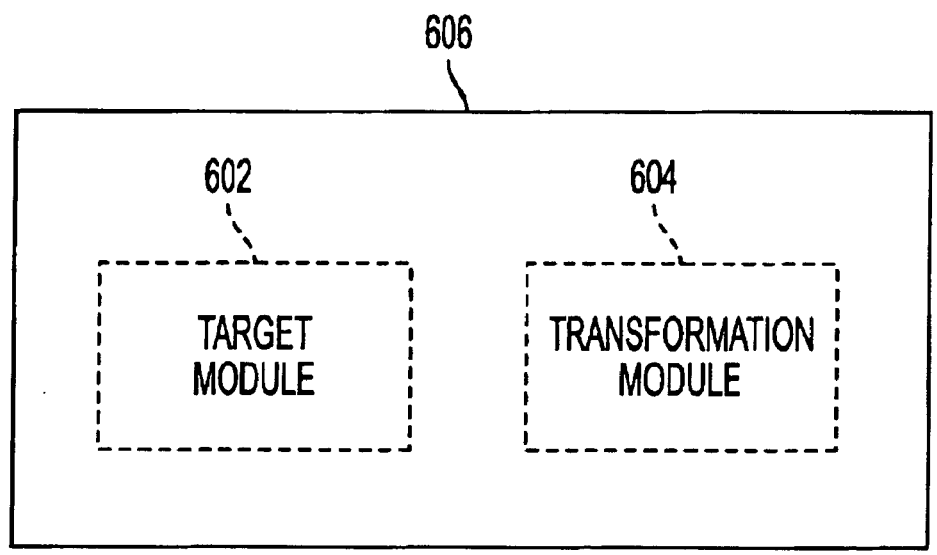
FIG. 6 shows a relationship between a target module and a transformation module in accordance with an embodiment of the invention.

FIG. 6 shows that the transformation program and the target program of the embodiment described in FIG. 1, can alternatively be implemented respectively as a module 604 and a target program module 602 together within an application 606. The module 604 can appear as a printer driver to the module 602. For example, the transformation program module 604 can be implemented as a DLL, OCX, Active X Control program, or in any other form that can be marketed to software vendors for integration into independently developed applications.

Figure 7:
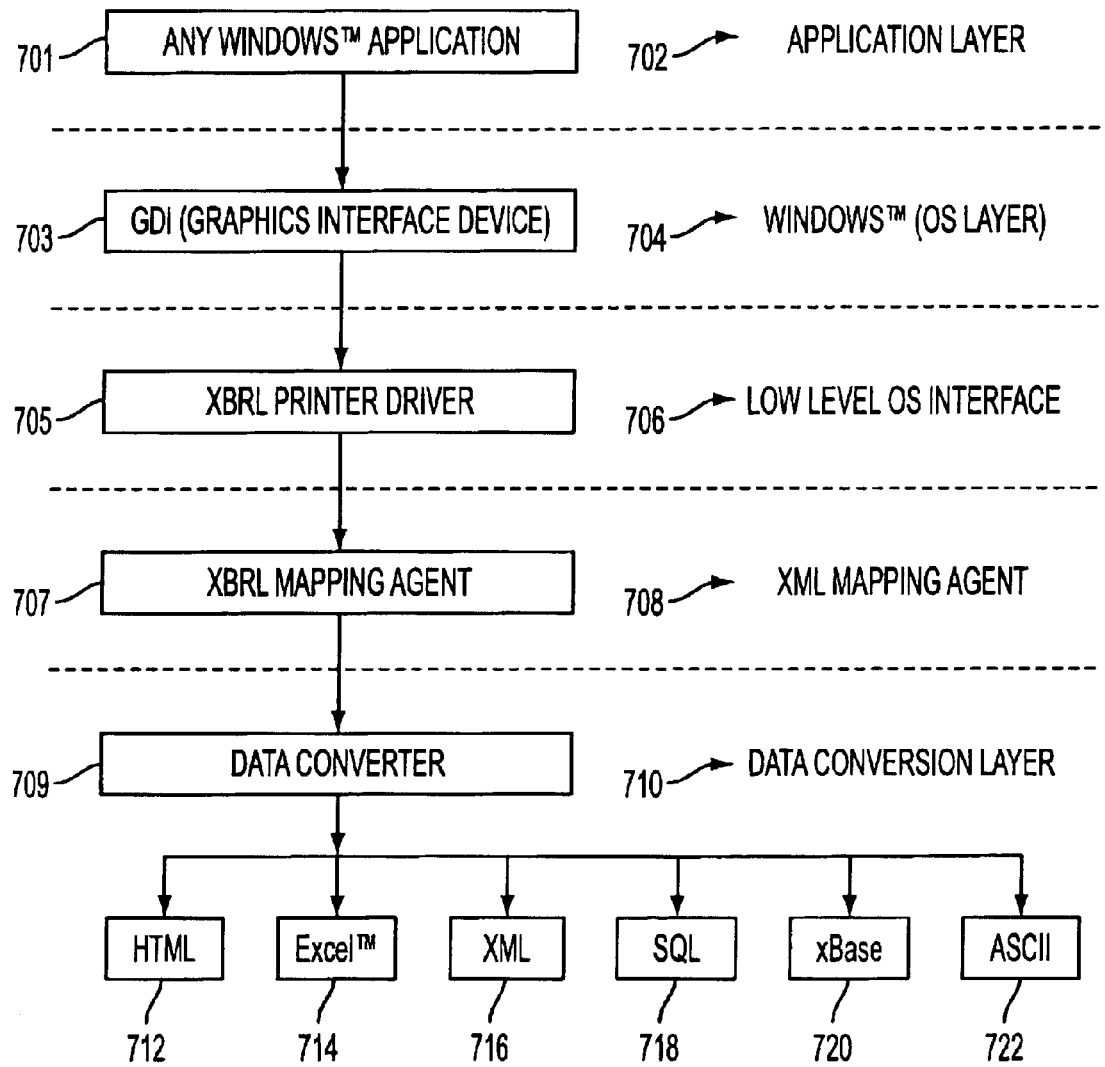
FIG. 7 shows software layers in an exemplary embodiment of the invention.

FIG. 7 shows an exemplary structure of various embodiments of the invention, with respect to the software layers of a computer. In particular, FIG. 7 shows an application layer 702, at which any Windows™ application 701 operates on the computer. Below the layer 702 is a Windows™ OS (Operating System) layer 704, in which can be found a GDI (Graphics Interface Device) 703. Below the layer 704 is a low level OS interface layer 706, at which an XBRL Printer Driver 705 in accordance with the invention can be found. Below the layer 706, is an XML mapping agent layer 708, with an XML Mapping Agent 707. Below the layer 708 is a data conversion layer 710, which includes a Data Converter 709 that outputs or can output the data in a variety of formats, including the formats 712-722 shown (HTML, Excel™, XML, SQL, xBase, and ASCII respectively). In accordance with various exemplary embodiments of the invention, a transformation program that performs various functions of the invention includes the XBRL Printer Driver 705, the XBRL Mapping Agent 707, and the Data Converter 709. Although the elements 705, 707 are shown as being XBRL-related, the elements 705, 707 can be related to any or all of the formats, taxonomies, protocols, standards, etc. described above and their equivalents. In addition, the formats 712–722 are exemplary and not limiting.

With respect to each of the described embodiments, information provided by the user, for example associations between data from a target application and XBRL labels or tags, can be made using drag-and-drop, cut-and-paste, selection of items from a proffered menu, keyboard entry, or any other appropriate technique. In addition, the described embodiments can be variously combined. Extracting data from the target program or target application can include, in addition to or instead of obtaining a print file, accessing data directly from a file or out of a database without running or launching the parent (target) application, scraping data off of a display screen or window, and so forth.

Those skilled in the art will recognize that the software functions described herein can be variously implemented as a) software instructions running on a hardware machine such as a desktop computer having a central microprocessor, b) appropriately configured Field Programmable Gate Array(s) (FPGAs), c) Application Specific Integrated Circuit(s) (ASICs), or any other equivalent or suitable computation device.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A computer implemented method for adding metadata to a collection of data and first metadata wherein the first metadata are associated with the data, the method comprising:

identifying data in the collection based on the first metadata and one or more locations of the data and/or the first metadata in the collection; and adding second metadata to the collection based on the identified data; wherein the step of identifying comprises identifying a first value in a first currency; and the method comprises determining a second value in a second currency, based on the first value and a conversion factor.

2. The method of claim 1, wherein a user specifies the second currency and the conversion factor.

3. The method of claim 2, wherein the user specifies the conversion factor by indicating a date on which the conversion factor is known.

4. A computer implemented method for adding metadata to a collection of data and first metadata wherein the first metadata are associated with the data, the method comprising:

identifying data in the collection based on the first metadata and one or more locations of the data and/or the first metadata in the collection; and adding second metadata to the collection based on the identified data; wherein the first metadata organize the identified data in accordance with a first standard; and the second metadata organize the identified data in accordance with a second standard.

5. The method of claim 4, comprising capturing the collection of data and first metadata as a data stream.

6. The method of claim 5 comprising:

storing the captured data stream;

wherein the identifying step is performed on the stored data stream.

7. The method of claim 4, wherein:

the first standard is one of United States GAAP (Generally Accepted Accounting Principles), and International GAAP; and the second standard is the other of United States GAAP and International GAAP.

8. The method of claim 4, wherein the second metadata map the identified data into a spreadsheet.

9. The method of claim 4, wherein the second metadata map the identified data into a database.

10. The method of claim 4, wherein the second metadata map the identified data to a flat file.

11. The method of claim 10, comprising outputting a data definition that defines a structure of the flat file.

12. The method of claim 11, wherein the structure indicates locations of the mapped data within the flat file.

13. The method of claim 5 wherein the steps of capturing and identifying are performed at different locations.

14. The method of claim 5 wherein the data stream is in the form of a data output to a computer display screen.

15. The method of claim 5 wherein the data stream is in the form of a data output to a computer data port.

16. The method of claim 5 wherein the data stream is in the form of a data output to a data storage device.

17. The method of claim 16, wherein the data storage device is a Random Access Memory in a computer.

18. The method of claim 16 wherein the data storage device is a disk drive.

19. The method of claim 5 wherein the data stream is generated at an Operating System level of a computer implementing the method.

20. The method of claim 5, comprising providing the data stream from a target program to a transformation program, wherein the transformation program a) performs the steps of identifying and adding, and b) appears to the target program as a device driver.

21. The method of claim 20, wherein the transformation program is independent from the target program.

22. The method of claim 20, wherein the transformation program and the target program are modules incorporated within a single program.

23. The method of claim 5, wherein the data stream is in a form of data output to a computer printer.

24. A computer implemented method for adding metadata to a collection of data and first metadata wherein the first metadata are associated with the data, the method comprising:

identifying data in the collection based on the first metadata and one or more locations of the data and/or the first metadata in the collection; and adding second metadata to the collection based on the identified data; wherein the second metadata map the identified data to an eXtensible Markup Language (XML) taxonomy.

25. The method of claim 24, comprising capturing the collection of data and first metadata as a data stream.

26. The method of claim 25 comprising:

storing the captured data stream;

wherein the identifying step is performed on the stored data stream.

27. The method of claim 25 wherein the steps of capturing and identifying are performed at different locations.

28. The method of claim 25 wherein the data stream is in the form of a data output to a computer display screen.

29. The method of claim 25 wherein the data stream is in the form of a data output to a computer data port.

30. The method of claim 25 wherein the data stream is in the form of a data output to a data storage device.

31. The method of claim 30, wherein the data storage device is a Random Access Memory in a computer.

32. The method of claim 30 wherein the data storage device is a disk drive.

33. The method of claim 25 wherein the data stream is generated at an Operating System level of a computer implementing the method.

34. The method of claim 24, wherein the second metadata map the identified data into a spreadsheet.

35. The method of claim 24, wherein the second metadata map the identified data into a database.

36. The method of claim 24, wherein the second metadata map the identified data to a flat file.

37. The method of claim 36, comprising outputting a data definition that defines a structure of the flat file.

38. The method of claim 37, wherein the structure indicates locations of the mapped data within the flat file.

39. The method of claim 24, wherein:
the step of identifying comprises identifying a first value in a first currency; and
the method comprises determining a second value in a second currency, based on the first value and a conversion factor.

40. The method of claim 24, wherein:
the first metadata organize the identified data in accordance with a first standard; and
the second metadata organize the identified data in accordance with a second standard.

41. The method of claim 24, wherein:
the second metadata comprise labels selected from a list associating the labels with the first metadata.

42. A computer implemented method for adding metadata to a collection of data and first metadata wherein the first metadata are associated with the data, the method comprising:
identifying data in the collection based on the first metadata and one or more locations of the data and/or the first metadata in the collection; and
adding second metadata to the collection based on the identified data; wherein
the second metadata comprise labels selected from a list associating the labels with the first metadata.

43. The method of claim 42, comprising removing the first metadata from the data collection.

44. The method of claim 42 comprising creating a file by combining the selected labels with at least the identified data.

45. The method of claim 42, comprising a step of requesting a user to select a label corresponding to a metadatum in the first metadata when the list does not associate a label with the metadatum.

46. The method of claim 45, comprising a step of adding the association indicated by the user's selection, to the list associating labels with the first metadata.

47. The method of claim 42, wherein the list comprises a plurality of labels associated with a metadatum.

48. The method of claim 47, wherein the plurality of labels comprises synonymous labels.

49. The method of claim 47, wherein the metadatum is identified in the data collection based on a label in the data collection corresponding to the metadatum.

50. The method of claim 49, wherein the selected label is different from the label in the data collection.

51. The method of claim 47, wherein:
the identifying step comprises identifying the metadatum in the data collection; and
the adding step comprises selecting a label from the plurality of labels associated with the identified metadatum.

52. The method of claim 51, wherein the labels in the plurality are in different languages.

53. The method of claim 52, wherein the selected labels are in a specified one of the different languages.

54. The method of claim 53, wherein the specified language is XBRL (Extensible Business Markup Language).

55. The method of claim 53, wherein the selected labels are in a specified human spoken language.

56. The method of claim 42, wherein the labels are consistent with XML (eXtensible Markup Language).

57. The method of claim 56, wherein the labels conform to an XBRL (eXtensible Business Reporting Language) specification.

58. The method of claim 57, wherein the labels are defined in at least one XBRL taxonomy.

59. The method of claim 42, wherein the first metadata comprises at least one text string.

60. A computer implemented method for adding metadata to a collection of data and first metadata wherein the first metadata are associated with the data, the method comprising:
identifying data in the collection based on the first metadata and one or more locations of the data and/or the first metadata in the collection; and
adding second metadata to the collection based on the identified data; wherein
the second metadata map the identified data to at least one of a file structure, a schema, and a taxonomy.

61. The method of claim 60, comprising capturing the collection of data and first metadata as a data stream.

62. The method of claim 61 comprising:
storing the captured data stream;
wherein the identifying step is performed on the stored data stream.

63. The method of claim 61 wherein the steps of capturing and identifying are performed at different locations.

64. The method of claim 61 wherein the data stream is in the form of a data output to a computer display screen.

65. The method of claim 61 wherein the data stream is in the form of a data output to a computer data port.

66. The method of claim 61 wherein the data stream is in the form of a data output to a data storage device.

67. The method of claim 66, wherein the data storage device is a Random Access Memory in a computer.

68. The method of claim 66 wherein the data storage device is a disk drive.

69. The method of claim 61 wherein the data stream is generated at an Operating System level of a computer implementing the method.

70. The method of claim 60, wherein the second metadata map the identified data into a spreadsheet.

71. The method of claim 60, wherein the second metadata map the identified data into a database.

72. The method of claim 60, wherein the second metadata map the identified data to a flat file.

73. The method of claim 72, comprising outputting a data definition that defines a structure of the flat file.

74. The method of claim 73, wherein the structure indicates locations of the mapped data within the flat file.

75. A machine readable medium comprising a computer program for causing a computation device to perform:
in a collection of data and first metadata wherein the first metadata are associated with the data, identifying data in the collection based on the first metadata and one or more locations of the data and/or the first metadata in the collection; and adding second metadata to the collection based on the identified data; wherein the identifying comprises identifying a first value in a first currency; and the computer program causes the computation device to determine a second value in a second currency, based on the first value and a conversion factor.

76. The medium of claim 75, wherein the second currency and the conversion factor are user-specified.

77. The medium of claim 76, wherein the conversion factor is specified by a date on which the conversion factor is known.

78. A machine readable medium comprising a computer program for causing a computation device to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the first metadata organize the identified data in accordance with a first standard; and the second metadata organize the identified data in accordance with a second standard.

79. The medium of claim 78, wherein the computer program causes the computation device to capture the collection of data and first metadata as a data stream.

80. The medium of claim 79, wherein the computer program causes the computation device to store the captured data stream, and wherein the identifying is performed on the stored data stream.

81. The medium of claim 79 wherein the data stream is in the form of a data output to a computer display screen.

82. The medium of claim 79 wherein the data stream is in the form of a data output to a computer data port.

83. The medium of claim 79 wherein the data stream is in the form of a data output to a data storage device.

84. The medium of claim 83, wherein the data storage device is a Random Access Memory in a computer.

85. The medium of claim 84 wherein the data storage device is a disk drive.

86. The medium of claim 79 wherein the data stream is generated at an Operating System level of a computer.

87. The medium of claim 79, wherein the program comprises a transformation program and causes the computation device to provide the data stream from a target program to the transformation program, wherein the transformation program a) performs the identifying and adding, and b) appears to the target program as a device driver.

88. The medium of claim 87, wherein the transformation program is independent from the target program.

89. The medium of claim 87, wherein the transformation program and the target program are modules incorporated within a single program.

90. The medium of claim 79, wherein the data stream is in a form of data output to a computer printer.

91. The medium of claim 78, wherein:

the first standard is one of United States GAAP (Generally Accepted Accounting Principles), and International GAAP; and the second standard is the other of United States GAAP and International GAAP.

92. The medium of claim 78, wherein the second metadata map the identified data into a spreadsheet.

93. The medium of claim 78, wherein the second metadata map the identified data into a database.

94. The medium of claim 78, wherein the second metadata map the identified data to a flat file.

95. The medium of claim 94, wherein the program causes the computation device to output a data definition that defines a structure of the flat file.

96. The medium of claim 95, wherein the structure indicates locations of the mapped data within the flat file.

97. A machine readable medium comprising a computer program for causing a computation device to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the second metadata comprise labels selected from a list associating the labels with the first metadata.

98. The medium of claim 97, wherein the program causes the computation device to remove the first metadata from the data collection.

99. The medium of claim 97, wherein the program causes the computation device to create a file by combining the selected labels with at least the identified data.

100. The medium of claim 97, wherein the program causes the computation device to request a user to select a label corresponding to a metadatum in the first metadata when the list does not associate a label with the metadatum.

101. The medium of claim 100, wherein the program causes the computation device to add the association indicated by the user's selection, to the list associating labels with the first metadata.

102. The medium of claim 97, wherein the list comprises a plurality of labels associated with a metadatum.

103. The method of claim 102, wherein the plurality of labels comprises synonymous labels.

104. The medium of claim 102, wherein the metadatum is identified in the data collection based on a label in the data collection corresponding to the metadatum.

105. The medium of claim 104, wherein the selected label is different from the label in the data collection.

106. The medium of claim 102, wherein:

the identifying comprises identifying the metadatum in the data collection; and the adding comprises selecting a label from the plurality of labels associated with the identified metadatum.

107. The medium of claim 106, wherein the labels in the plurality are in different languages.

108. The medium of claim 107, wherein the selected labels are in a specified one of the different languages.

109. The medium of claim 108, wherein the specified language is XBRL (Extensible Business Markup Language).

110. The medium of claim 108, wherein the selected labels are in a specified human spoken language.

111. The medium of claim 97, wherein the labels are consistent with XML (eXtensible Markup Language).

112. The medium of claim 111, wherein the labels conform to an XBRL (eXtensible Business Reporting Language) specification.

113. The medium of claim 112, wherein the labels are defined in at least one XBRL taxonomy.

114. The medium of claim 97, wherein the first metadata comprises at least one text string.

115. A machine readable medium comprising a computer program for causing a computation device to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the second metadata map the identified data to an eXtensible Markup Language (XML) taxonomy.

116. The medium of claim 115 wherein the computer program causes the computation device to capture the collection of data and first metadata as a data stream.

117. The medium of claim 116 wherein the data stream is in the form of a data output to a computer display screen.

118. The medium of claim 116 wherein the data stream is in the form of a data output to a computer data port.

119. The medium of claim 116 wherein the data stream is in the form of a data output to a data storage device.

120. The medium of claim 119, wherein the data storage device is a Random Access Memory in a computer.

121. The medium of claim 120 wherein the data storage device is a disk drive.

122. The medium of claim 116, wherein the computer program causes the computation device to store the captured data stream, and wherein the identifying is performed on the stored data stream.

123. The medium of claim 116 wherein the data stream is generated at an Operating System level of a computer.

124. The medium of claim 115, wherein the second metadata map the identified data into a spreadsheet.

125. The medium of claim 115, wherein the second metadata map the identified data into a database.

126. The medium of claim 115, wherein the second metadata map the identified data to a flat file.

127. The medium of claim 126, wherein the program causes the computation device to output a data definition that defines a structure of the flat file.

128. The medium of claim 127, wherein the structure indicates locations of the mapped data within the flat file.

129. The medium of claim 115, wherein:

the identifying comprises identifying a first value in a first currency; and the computer program causes the computation device to determine a second value in a second currency, based on the first value and a conversion factor.

130. The medium of claim 115, wherein:

the first metadata organize the identified data in accordance with a first standard; and the second metadata organize the identified data in accordance with a second standard.

131. The medium of claim 115, wherein:

the second metadata comprise labels selected from a list associating the labels with the first metadata.

132. A machine readable medium comprising a computer program for causing a computation device to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the second metadata map the identified data to at least one of a file structure, a schema, and a taxonomy.

133. The medium of claim 132 wherein the computer program causes the computation device to capture the collection of data and first metadata as a data stream.

134. The medium of claim 133 wherein the data stream is in the form of a data output to a computer display screen.

135. The medium of claim 133 wherein the data stream is in the form of a data output to a computer data port.

136. The medium of claim 133 wherein the data stream is in the form of a data output to a data storage device.

137. The medium of claim 136, wherein the data storage device is a Random Access Memory in a computer.

138. The medium of claim 137 wherein the data storage device is a disk drive.

139. The medium of claim 133, wherein the computer program causes the computation device to store the captured data stream, and wherein the identifying is performed on the stored data stream.

140. The medium of claim 133 wherein the data stream is generated at an Operating System level of a computer.

141. The medium of claim 132, wherein the second metadata map the identified data into a spreadsheet.

142. The medium of claim 132, wherein the second metadata map the identified data into a database.

143. The medium of claim 132, wherein the second metadata map the identified data to a flat file.

144. The medium of claim 143, wherein the program causes the computation device to output a data definition that defines a structure of the flat file.

145. The medium of claim 144, wherein the structure indicates locations of the mapped data within the flat file.

146. A system comprising a computation device arranged to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the identifying comprises identifying a first value in a first currency; and the computation device determines a second value in a second currency, based on the first value and a conversion factor.

147. The system of claim 146, wherein the second currency and the conversion factor are user-specified.

148. The system of claim 147, wherein the conversion factor is specified by a date on which the conversion factor is known.

149. A system comprising a computation device arranged to perform:

in a collection of data and first metadata wherein the first metadata are associated with the data, identifying data in the collection based on the first metadata and one or more locations of the data and/or the first metadata in the collection; and adding second metadata to the collection based on the identified data; wherein the first metadata organize the identified data in accordance with a first standard; and the second metadata organize the identified data in accordance with a second standard.

150. The system of claim 149, wherein the computation device captures the collection of data and first metadata as a data stream.

151. The system of claim 150, wherein the computation device stores the captured data stream, and wherein the computation device performs the identifying on the stored data stream.

152. The system of claim 150 wherein the data stream is in the form of a data output to a computer display screen.

153. The system of claim 150 wherein the data stream is in the form of a data output to a computer data port.

154. The system of claim 150 wherein the data stream is in the form of a data output to a data storage device.

155. The system of claim 154, wherein the data storage device is a Random Access Memory in the computation device.

156. The system of claim 155 wherein the data storage device is a disk drive.

157. The system of claim 150 wherein the data stream is generated at an Operating System level of a computer.

158. The system of claim 150, wherein the computation device is arranged to receive the data stream from a target program, and to appear to the target program as a device driver.

159. The medium of claim 150, wherein the data stream is in a form of data output to a computer printer.

160. The system of claim 149, wherein:
the first standard is one of United States GAAP (Generally Accepted Accounting Principles), and International GAAP; and
the second standard is the other of United States GAAP and International GAAP.

161. The system of claim 149, wherein the second metadata map the identified data into a spreadsheet.

162. The system of claim 149, wherein the second metadata map the identified data into a database.

163. The system of claim 149, wherein the second metadata map the identified data to a flat file.

164. The system of claim 163, wherein the computation device is arranged to output a data definition that defines a structure of the flat file.

165. The system of claim 164, wherein the structure indicates locations of the mapped data within the flat file.

166. A system comprising a computation device arranged to perform:
in a collection of data and first metadata wherein the first metadata are associated with the data, identifying data in the collection based on the first metadata and one or more locations of the data and/or the first metadata in the collection; and
adding second metadata to the collection based on the identified data; wherein
the second metadata map the identified data to an eXtensible Markup Language (XML) taxonomy.

167. The system of claim 166, wherein the second metadata map the identified data into a spreadsheet.

168. The system of claim 166, wherein the second metadata map the identified data into a database.

169. The system of claim 166, wherein the second metadata map the identified data to a flat file.

170. The system of claim 169, wherein the computation device is arranged to output a data definition that defines a structure of the flat file.

171. The system of claim 170, wherein the structure indicates locations of the mapped data within the flat file.

172. The system of claim 166, wherein the computation device captures the collection of data and first metadata as a data stream.

173. The system of claim 172, wherein the computation device stores the captured data stream, and wherein the computation device performs the identifying on the stored data stream.

174. The system of claim 172 wherein the data stream is in the form of a data output to a computer display screen.

175. The system of claim 172 wherein the data stream is in the form of a data output to a computer data port.

176. The system of claim 172 wherein the data stream is in the form of a data output to a data storage device.

177. The system of claim 176, wherein the data storage device is a Random Access Memory in the computation device.

178. The system of claim 177 wherein the data storage device is a disk drive.

179. The system of claim 172 wherein the data stream is generated at an Operating System level of a computer.

180. The system of claim 166, wherein:
the identifying comprises identifying a first value in a first currency; and
the computation device determines a second value in a second currency, based on the first value and a conversion factor.

181. The system of claim 166, wherein:
the first metadata organize the identified data in accordance with a first standard; and
the second metadata organize the identified data in accordance with a second standard.

182. The system of claim 166, wherein:
the second metadata comprise labels selected from a list associating the labels with the first metadata.

183. A system comprising a computation device arranged to perform:
in a collection of data and first metadata wherein the first metadata are associated with the data, identifying data in the collection based on the first metadata and one or more locations of the data and/or the first metadata in the collection; and
adding second metadata to the collection based on the identified data; wherein
the second metadata map the identified data to at least one of a file structure, a schema, and a taxonomy.

184. The system of claim 183, wherein the second metadata map the identified data into a spreadsheet.

185. The system of claim 183, wherein the second metadata map the identified data into a database.

186. The system of claim 183, wherein the second metadata map the identified data to a flat file.

187. The system of claim 186, wherein the computation device is arranged to output a data definition that defines a structure of the flat file.

188. The system of claim 187, wherein the structure indicates locations of the mapped data within the flat file.

189. The system of claim 183, wherein the computation device captures the collection of data and first metadata as a data stream.

190. The system of claim 189, wherein the computation device stores the captured data stream, and wherein the computation device performs the identifying on the stored data stream.

191. The system of claim 189 wherein the data stream is in the form of a data output to a computer display screen.

192. The system of claim 189 wherein the data stream is in the form of a data output to a computer data port.

193. The system of claim 189 wherein the data stream is in the form of a data output to a data storage device.

194. The system of claim 193, wherein the data storage device is a Random Access Memory in the computation device.

195. The system of claim 194 wherein the data storage device is a disk drive.

196. The system of claim 189 wherein the data stream is generated at an Operating System level of a computer.

197. A system comprising a computation device arranged to perform:
   in a collection of data and first metadata wherein the first metadata are associated with the data, identifying data in the collection based on the first metadata and one or more locations of the data and/or the first metadata in the collection; and
   adding second metadata to the collection based on the identified data; wherein
   the second metadata comprise labels selected from a list associating the labels with the first metadata.

198. The system of claim 197, wherein the computation device is arranged to remove the first metadata from the data collection.

199. The system of claim 197, wherein the computation device is arranged to create a file by combining the selected labels with at least the identified data.

200. The system of claim 197, wherein the computation device is arranged to request a user to select a label corresponding to a metadatum in the first metadata when the list does not associate a label with the metadatum.

201. The system of claim 200, wherein the computation device is arranged to add the association indicated by the user's selection, to the list associating labels with the first metadata.

202. The system of claim 197, wherein the list comprises a plurality of labels associated with a metadatum.

203. The system of claim 202, wherein the plurality of labels comprises synonymous labels.

204. The system of claim 202, wherein the metadatum is identified in the data collection based on a label in the data collection corresponding to the metadatum.

205. The system of claim 204, wherein the selected label is different from the label in the data collection.

206. The system of claim 202, wherein:
   the identifying comprises identifying the metadatum in the data collection; and
   the adding comprises selecting a label from the plurality of labels associated with the identified metadatum.

207. The system of claim 206, wherein the labels in the plurality are in different languages.

208. The system of claim 207, wherein the selected labels are in a specified one of the different languages.

209. The system of claim 208, wherein the specified language is XBRL (Extensible Business Markup Language).

210. The system of claim 208, wherein the selected labels are in a specified human spoken language.

211. The system of claim 197, wherein the labels are consistent with XML (eXtensible Markup Language).

212. The system of claim 211, wherein the labels conform to an XBRL (eXtensible Business Reporting Language) specification.

213. The system of claim 212, wherein the labels are defined in at least one XBRL taxonomy.

214. The system of claim 197, wherein the first metadata comprises at least one text string.

* * * * *